United States Patent
Tsubouchi et al.

(10) Patent No.: US 7,080,588 B2
(45) Date of Patent: Jul. 25, 2006

(54) NEGATIVE PRESSURE TYPE BOOSTER

(75) Inventors: Kaoru Tsubouchi, Kariya (JP); Yoji Inoue, Kariya (JP); Tomoyasu Sakai, Kariya (JP); Yoko Takatori, Kariya (JP)

(73) Assignee: Advics Co., Ltd., Kariya (JP)

( * ) Notice: Subject to any disclaimer, the term of this patent is extended or adjusted under 35 U.S.C. 154(b) by 82 days.

(21) Appl. No.: 10/965,911

(22) Filed: Oct. 18, 2004

(65) Prior Publication Data

US 2005/0092167 A1 May 5, 2005

(30) Foreign Application Priority Data

Nov. 4, 2003 (JP) .............................. 2003-374111

(51) Int. Cl.
*B60T 13/57* (2006.01)

(52) U.S. Cl. ...................................... 91/369.3

(58) Field of Classification Search ................. 91/367, 91/369.2, 369.3, 376 R
See application file for complete search history.

(56) References Cited

U.S. PATENT DOCUMENTS 5,483,866 A * 1/1996 Schluter .................. 91/376 R
6,334,383 B1 * 1/2002 Tsubouchi et al. ............ 91/367
6,467,390 B1 * 10/2002 Harth et al. ............... 91/369.2
6,715,401 B1 * 4/2004 Takasaki et al. .......... 91/369.2
6,755,116 B1 * 6/2004 Tsubouchi et al. ........ 91/369.2

FOREIGN PATENT DOCUMENTS

WO    WO 01/32488 A    5/2001

* cited by examiner

*Primary Examiner*—Thomas E. Lazo
(74) *Attorney, Agent, or Firm*—Buchanan Ingersoll PC (57) ABSTRACT

A negative pressure type booster includes a power piston, a slide valve, and a holding mechanism, among others, and assists a driver during emergency braking. The holding mechanism is adapted to hold the slide valve at a predetermined frontward position, and includes a latch member that is mounted to the power piston in such a manner as to be linearly movable in a radial direction, and a garter spring for biasing the latch member radially inward. The latch member has a hook that can be engaged with and disengaged from a hook provided on the slide valve. When a plunger moves frontward relative to the power piston by a quantity greater than a predetermined value, a push slope provided on the plunger pushes a passive slope provided on the latch member radially outward, whereby the hook of the latch member is disengaged from the hook of the slide valve.

6 Claims, 5 Drawing Sheets

NEGATIVE PRESSURE TYPE BOOSTER

BACKGROUND OF THE INVENTION

1. Field of the Invention

The present invention relates to a negative pressure type booster for use in a vehicular brake system, and more particularly to a negative pressure type booster for making up for lack of force at a brake pedal so as to assist a driver during emergency braking.

2. Description of the Related Art

Recent analyses have revealed that, in many cases, a vehicle fails to exhibit its braking capability sufficiently when a driver steps on a brake pedal in alarm upon sudden emergence of an obstacle in the path of the vehicle; i.e., during emergency braking, since a force that the driver applies to a brake pedal is considerably smaller than a force that generates such a high brake fluid pressure as to cause wheel lock-up. On the basis of the analytic results, there have been proposed and put into practical use devices that judge from the speed of stepping on a brake pedal or the rate of increase of the fluid pressure of a master cylinder whether or not braking is of an ordinary operation or an emergency operation, and, during emergency braking, automatically increase brake fluid pressure to such a level as to cause wheel lock-up.

WO 01/32488 discloses one of such negative pressure type boosters of various structures. The disclosed negative pressure type booster can change over its input-output characteristic between an ordinary braking characteristic and an emergency braking characteristic. During emergency braking, the input-output characteristic is changed over from the ordinary braking characteristic to the emergency braking characteristic, thereby generating a strong braking force.

The negative pressure type booster disclosed in WO 01/32488 includes a housing having a pressure chamber formed therein; a movable diaphragm mounted in the housing in a frontward/rearward movable condition and dividing the pressure chamber into a constant-pressure chamber and a variable-pressure chamber; a power piston connected to the movable diaphragm; an input member provided in the power piston in a frontward/rearward movable condition relative to the power piston and receiving an external operation force; an output member for outputting, to an external device, a thrust force generated by the power piston; a slide valve disposed between the power piston and the input member, and mounted coaxially to the power piston in a frontward/rearward movable condition; holding means for holding the slide valve at a predetermined frontward position when the frontward-movement quantity of the input member relative to the power piston is equal to or less than a predetermined value; moving means for moving the slide valve rearward by a predetermined quantity when the frontward-movement quantity of the input member relative to the power piston is greater than the predetermined value; and return means for returning the slide valve to the predetermined frontward position when the power piston and the slide valve return to respectively predetermined positions relative to the housing. The disclosed negative pressure type booster also includes a control valve mounted in the power piston and including an atmospheric control valve portion for establishing/shutting off communication between the variable-pressure chamber and the atmosphere in cooperation with an atmospheric valve seat provided on the input member, and a vacuum control valve portion for establishing/shutting off communication between the variable-pressure chamber and the constant-pressure chamber in cooperation with a vacuum valve seat provided on the power piston and/or a vacuum valve seat provided on the slide valve. The disclosed negative pressure type booster provides various advantages. Notably, the term "rearward" refers to the side toward a brake pedal or the side toward the vehicular rear as viewed from the negative pressure type booster, and the term "frontward" refers to the side toward a brake master cylinder or the side toward the vehicular front as viewed from the negative pressure type booster.

However, in the conventional negative pressure type booster, a holding member, which partially constitutes the holding means, the movable means, and the return means, is mounted to the power piston via a fulcrum member in a radially tiltable condition. In other words, the fulcrum member is required in mounting the holding member to the power piston. Also, the holding member is elongated in the axial direction of the power piston and extends along the axial direction, thus causing an increase in the overall length (axial length) of the negative pressure type booster. The holding member is disengaged from the slide valve by means of tilting radially outward about its portion of engagement with the fulcrum member. Thus, accuracy in disengagement timing decreases, resulting in a tendency toward a variation in a threshold value for effecting an emergency braking characteristic. Therefore, activation of emergency braking tends to become inconsistent.

SUMMARY OF THE INVENTION

The present invention has been accomplished to solve the above-mentioned problems, and an object of the invention is to provide a negative pressure type booster having a compact structure and exhibiting a consistent threshold value for effecting an emergency braking characteristic.

To achieve the above object, the present invention provides a negative pressure type booster which comprises a housing having a pressure chamber formed therein; a movable diaphragm mounted in the housing in a frontward/rearward movable condition and dividing the pressure chamber into a constant-pressure chamber and a variable-pressure chamber; a power piston connected to the movable diaphragm; an input member provided in the power piston to be moved frontward and rearward relative to the power piston and receiving an external operation force; an output member for outputting, to an external device, a thrust force generated by the power piston; a slide valve disposed between the power piston and the input member, and mounted coaxially to the power piston to be moved frontward and rearward; holding means for holding the slide valve at a predetermined frontward position when a frontward-movement quantity of the input member relative to the power piston is equal to or less than a predetermined value; moving means for moving the slide valve rearward by a predetermined quantity when the frontward-movement quantity of the input member relative to the power piston is greater than the predetermined value; return means for returning the slide valve to the predetermined frontward position when the power piston and the slide valve return to respectively predetermined positions relative to the housing; and a control valve mounted in the power piston and comprising an atmospheric control valve portion for establishing and shutting off communication between the variable-pressure chamber and the atmosphere in cooperation with an atmospheric valve seat provided on the input member, and a vacuum control valve portion for establishing and shutting off communication between the variable-pressure chamber and the constant-pressure chamber in cooperation with a vacuum valve seat provided on at least one of the power piston and the slide valve. In the negative pressure type booster of the present invention, the holding means comprises a latch member that is mounted to the power piston in such a manner as to be linearly movable in a radial direction, and a biasing member for biasing the latch member radially inward; the latch member has a hook that can be engaged with and disengaged from a hook provided on the slide valve; and the hook of the latch member and the biasing member constitute the holding means.

In the negative pressure type booster of the present invention, the latch member can be directly mounted to the power piston, and the latch member is mounted to the power piston in such a manner as to be linearly movable in a radial direction. Thus, the negative pressure type booster can have a simple and compact configuration. Also, the latch member has the hook that can be engaged with and disengaged from the hook provided on the slide valve; and the hook of the latch member, the hook of the slide valve, and the biasing member, which biases the latch member radially inward, constitute the holding means. Thus, the movement of the latch member associated with disengagement of its hook from the hook of the slide valve (the movement of the latch member associated with activation of an emergency braking characteristic) is linear. Accordingly, accuracy in disengagement timing increases, resulting in a consistent threshold value for effecting the emergency braking characteristic. Therefore, inconsistency in activation of an emergency braking operation is reduced.

The negative pressure type booster of the present invention may be configured in such a manner that when the frontward-movement quantity of the input member relative to the power piston is greater than the predetermined value, a push slope provided on the input member pushes a passive slope provided on the latch member toward the exterior of the power piston, whereby the hook of the latch member is disengaged from the hook of the slide valve, and a spring provided between the slide valve and the power piston moves the slide valve rearward by the predetermined quantity.

The negative pressure type booster of the present invention may be configured in such a manner that when the power piston and the slide valve return to the respectively predetermined positions relative to the housing, a push slope provided on the slide valve temporarily pushes a second passive slope provided on the latch member toward the exterior of the power piston, whereby the hook of the latch member is re-engaged with the hook of the slide valve to thereby hold the slide valve at the predetermined frontward position.

The negative pressure type booster of the present invention may be configured in such a manner that a single latch member is disposed in the power piston. In this case, a single radially extending hole for receiving the latch member is formed in the power piston. Thus, the power piston can assume sufficiently high strength. Also, the number of component parts of the negative pressure type booster can be reduced, whereby the negative pressure type booster can have a simple configuration.

The negative pressure type booster of the present invention may be configured in such a manner that the latch member is mounted in a radially extending hole formed in the power piston, in such a manner as to be linearly movable in a radial direction, and can project radially outward from the power piston; and the biasing member for biasing the latch member radially inward is a ringlike elastic member that is attached to the outer circumference of the power piston. In this case, the latch member and the biasing member can be mounted from the outside of the power piston, thereby facilitating the work of mounting the latch member and the biasing member to the power piston. Also, since an action of the latch member of projecting outward from the power piston can be visually observed, engagement and disengagement between the hook of the latch member and the hook of the slide valve can be confirmed from the outside of the power piston. Therefore, during the production of the negative pressure type booster, a function check can be performed easily and reliably.

The negative pressure type booster of the present invention may be configured in such a manner that a stopper is provided in the power piston in order to limit the quantity of radially inward movement of the latch member to a predetermined value. In this case, the stopper provides a standby position (terminal position of radially inward movement) for the latch member when the hook of the latch member is disengaged from the hook of the slide valve. This ensures smooth return operation in which the hook of the slide valve is re-engaged with the hook of the latch member.

BRIEF DESCRIPTION OF THE DRAWINGS

Various other features and attendant advantages of the present invention will be readily appreciated as the same becomes better understood by reference to the following detailed description of a preferred embodiment when considered in connection with the accompanying drawings, in which.

DESCRIPTION OF THE PREFERRED EMBODIMENT

Figure 1:
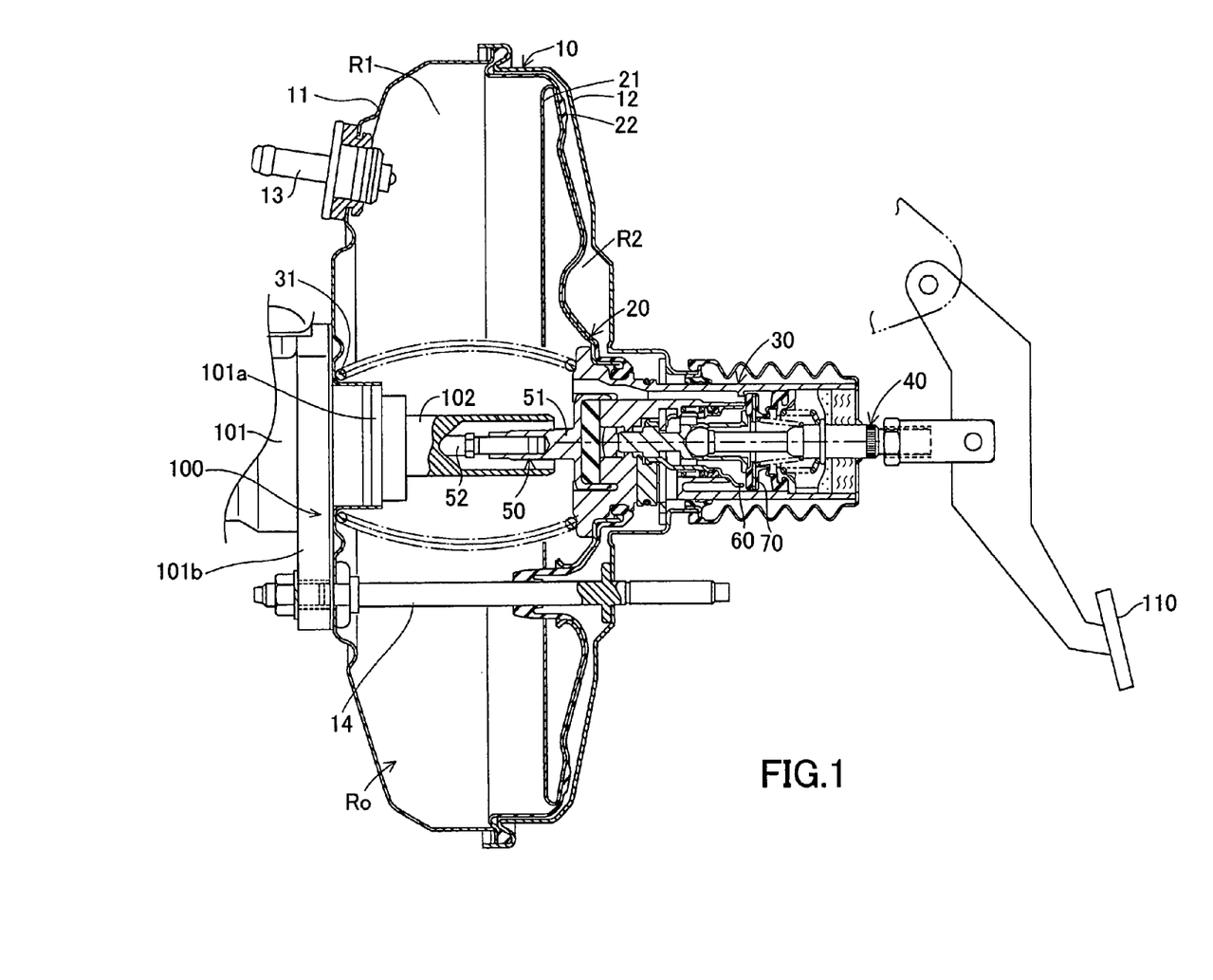
FIG. 1 is a sectional view showing a negative pressure type booster according to an embodiment of the present invention.
Figure 2:
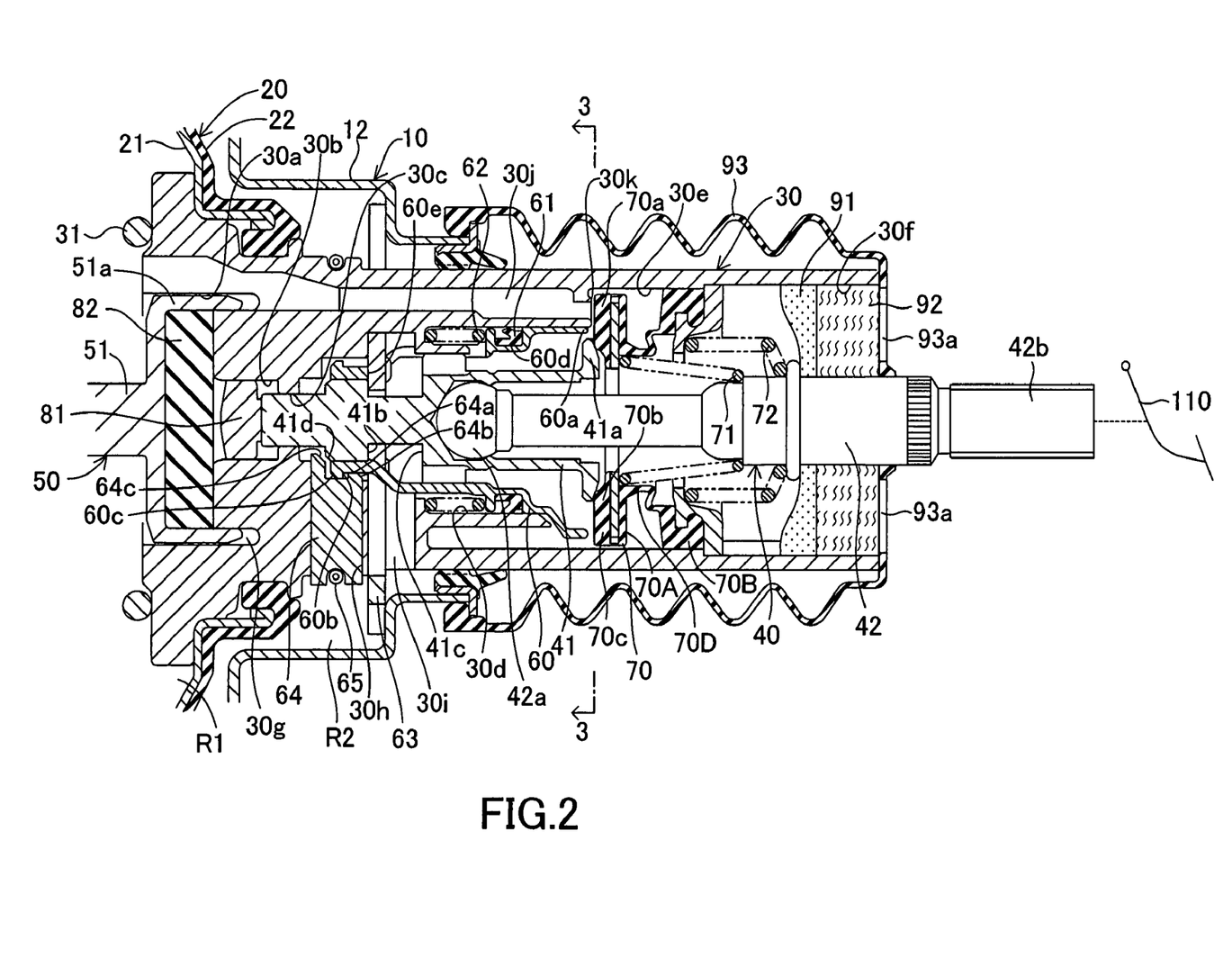
FIG. 2 is an enlarged sectional view showing a main portion of FIG. 1.
Figure 3:
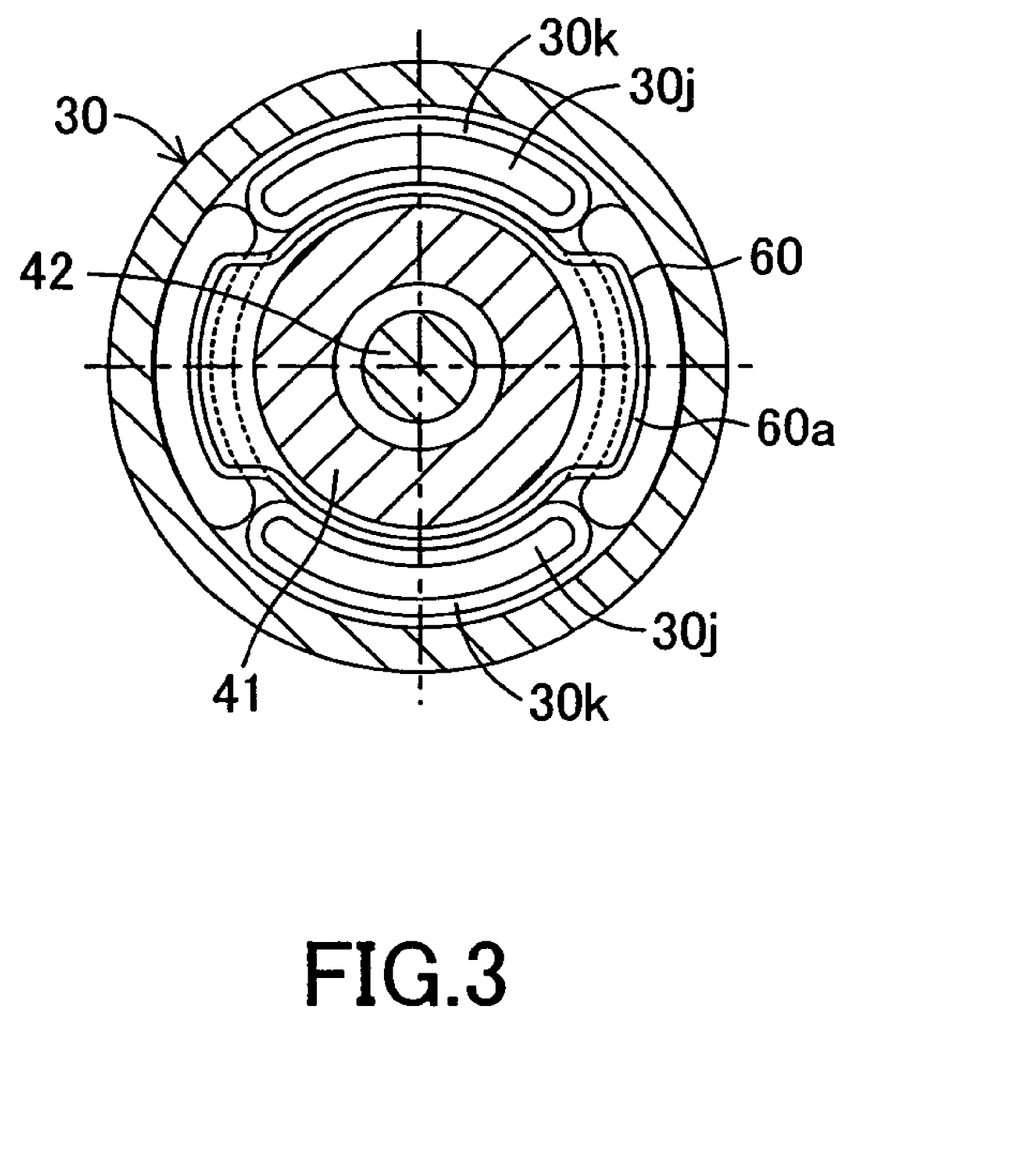
FIG. 3 is a sectional view taken along line 3—3 of FIG. 2.
Figure 4:
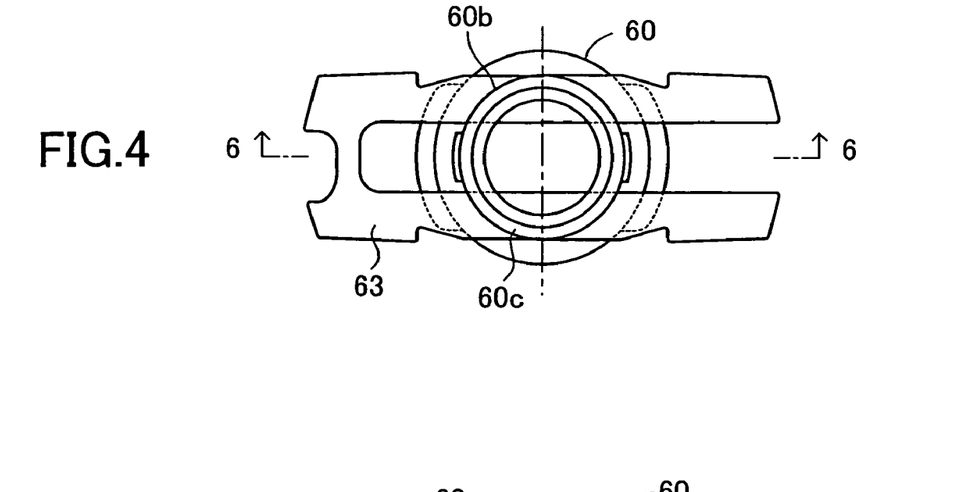
FIG. 4 is a front view showing the relation between the slide valve and the key member shown in FIG. 2.
Figure 5:
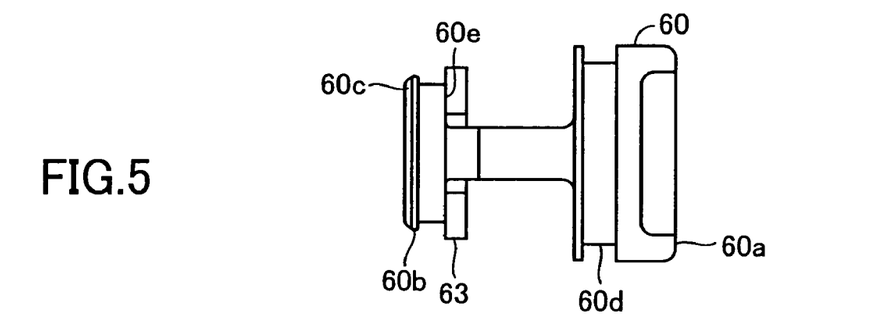
FIG. 5 is a side view of the slide valve and the key member shown in FIG. 4.
Figure 6:
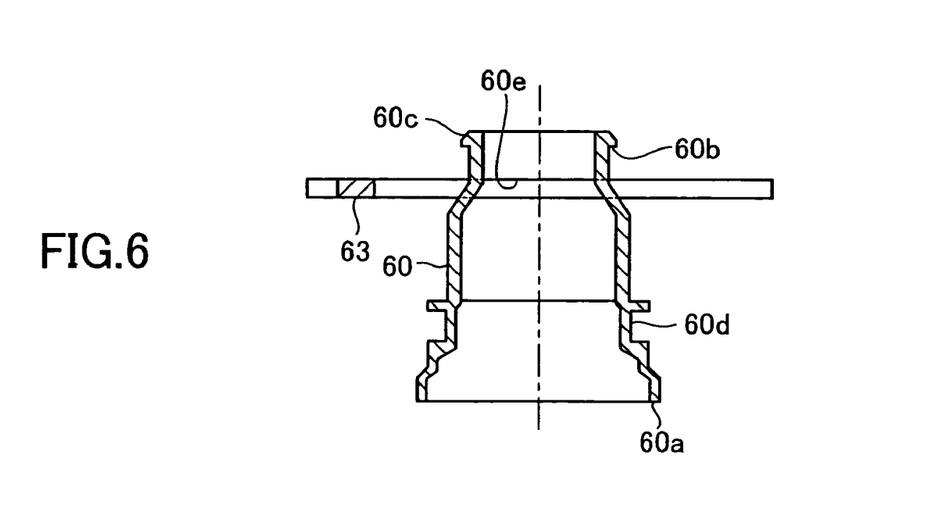
FIG. 6 is a sectional view taken along line 6—6 of FIG. 4.
Figure 7:
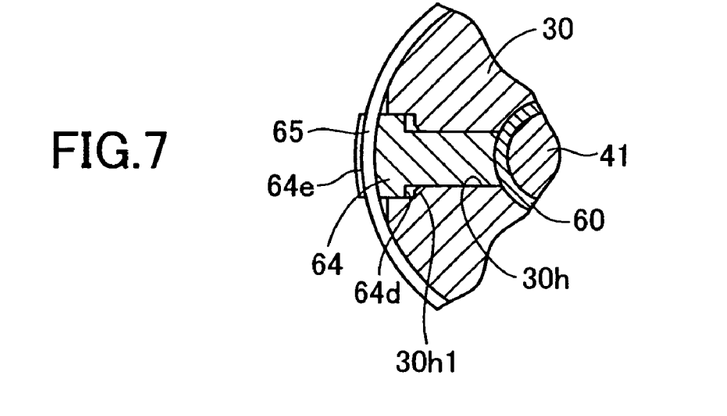
FIG. 7 is a partial, sectional view showing the assembled condition of the latch member and the garter spring shown in FIG. 2.
Figure 8:
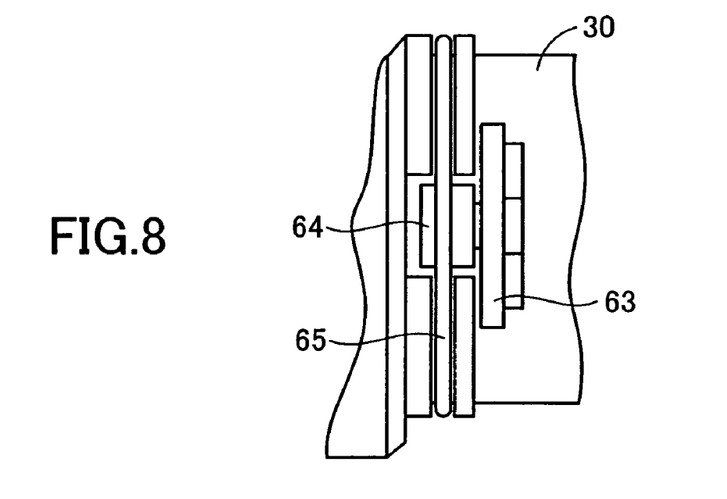
FIG. 8 is a side view showing the assembled condition of the power piston, the key member, the latch member, and the garter spring shown in FIG. 2.
Figure 9:
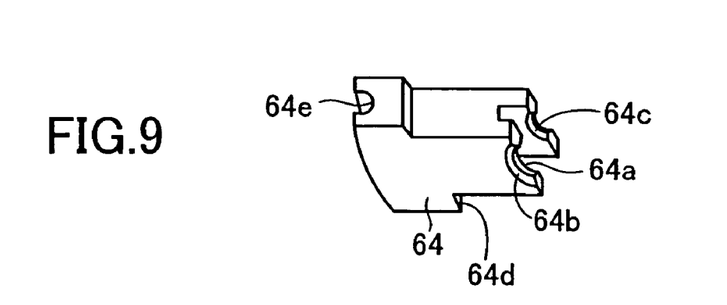
FIG. 9 is a perspective view of the latch member shown in FIGS. 2, 7, and 8.

An embodiment of the present invention will next be described in detail with reference to the drawings. FIGS. 1 to 3 show a negative pressure type booster according to the present embodiment. The negative pressure type booster includes a movable diaphragm 20 and a power piston 30, which are mounted to a housing 10, as well as an input member 40, an output member 50, a slide valve 60, and a control valve 70, which are mounted in the power piston 30.

As shown in FIG. 1, the housing 10 includes a front shell 11 and a rear shell 12. The front and rear shells 11 and 12 define a pressure chamber Ro therein. The movable diaphragm 20 divides the pressure chamber Ro into a constant-pressure chamber R1 and a variable-pressure chamber R2. The constant-pressure chamber R1 communicates with a vacuum source (e.g., an unillustrated intake manifold of an engine) at all times via a vacuum introduction pipe 13. Communication is established/shut off between the variable-pressure chamber R2 and the constant-pressure chamber R1 and between the variable-pressure chamber R2 and the atmosphere. The housing 10 is fixedly attached to a stationary member; i.e., a vehicular body (not shown), by means of threaded rear end portions of a plurality of tie rods 14 (FIG. 1 shows only a single tie rod 14). The tie rods 14 extend airtightly through the housing 10 and the movable diaphragm 20. Notably, a brake master cylinder 100 is fixedly connected to threaded front end portions of the tie rods 14.

The movable diaphragm 20 includes a metal plate 21 and a rubber diaphragm 22 and is disposed in a frontward/rearward movable condition relative to the housing 10. The diaphragm 22 is airtightly sandwiched, at its bead portion formed at its outer peripheral edge, between the front shell 11 and a peripheral bend edge portion of the rear shell 12. The diaphragm 22, together with the plate 21, is airtightly and fixedly fitted, at its bead portion formed at its inner peripheral edge, into a circumferential groove formed on the outer surface of a front flange portion of the power piston 30.

A rear end portion 101a of a cylinder body 101 of the brake master cylinder 100 shown in FIG. 1 airtightly extends through a central cylinder portion of the front shell 11 and projects into the constant-pressure chamber R1. The rear surface of a flange portion 101b of the cylinder body 101 abuts the front surface of the front shell 11. A piston 102 of the brake master cylinder 100 projects rearward into the constant-pressure chamber R1 from the cylinder body 101 and is pushed frontward by means of the front end of the output member 50.

The power piston 30 is a hollow piston connected to the movable diaphragm 20. A cylindrical portion of the power piston 30 is connected to the rear shell 12 of the housing 10 airtightly and in a frontward/rearward movable condition. A spring 31 disposed between the power piston 30 and the front shell 11 of the housing 10 biases the power piston 30 rearward. As shown in FIG. 2, an axial hole extends through the power piston 30. The axial hole includes, in the direction from the front end surface to the rear end surface of the power piston 30, a reaction chamber hole 30a; a contact member receptive-hole 30b having a diameter smaller than that of the reaction chamber hole 30a; a plunger receptive-hole 30c; a plunger-and-valve receptive-hole 30d having a diameter greater than that of the plunger receptive-hole 30c; a control valve receptive-hole 30e; and a filter receptive-hole 30f. An annular groove 30g is formed on the power piston 30 integrally with the reaction chamber hole 30a and coaxially with the contact member receptive-hole 30b.

The power piston 30 has a radially extending latch-member-mounting hole 30h in association with the plunger receptive-hole 30c and has a radially extending key member insertion hole 30i in association with the plunger-and-valve receptive-hole 30d. Also, the power piston 30 has a pair of communication holes 30j (see FIGS. 2 and 3) through which the constant-pressure chamber R1 and the control valve receptive-hole 30e can communicate with each other. An arcuate vacuum valve seat 30k is formed at a rear end portion of each of the communication holes 30j. A vacuum valve portion 70a of the control valve 70 can be seated on the vacuum valve seats 30k.

The input member 40 is provided in the power piston 30 in a frontward/rearward movable condition relative to the power piston 30 and receives an external operation force.

The input member 40 includes a plunger 41 and an input rod 42. The plunger 41 is accommodated in the contact member receptive-hole 30b and the control valve receptive-hole 30e of the power piston 30 and is axially (frontward/rearward) movable in relation to the power piston 30. The input rod 42 is articularly joined, at its spherical end portion 42a, to the plunger 41 and is connected, at its rear end portion 42b, to a brake pedal 110.

As shown in FIG. 2, the plunger 41 can abut, at its front end, a reaction member 82 accommodated in the reaction chamber hole 30a of the power piston 30 via a contact member 81 that is mounted in the contact member receptive-hole 30b of the power piston 30 in an axially movable condition. An annular atmospheric valve seat 41a is formed at the rear end of the plunger 41. The annular atmospheric valve seat 41a can be seated on and separated from an atmospheric valve portion 70b of the control valve 70. The reaction member 82 is a reaction rubber disk. While being accommodated in a cylindrical portion 51a of a rear member 51 of the output member 50, the reaction member 82 abuts the reaction force reception surface of the power piston 30 and can abut the front surface of the contact member 81.

The output member 50 includes the rear member 51 and an output rod 52 (see FIG. 1). The rear member 51, together with the reaction member 82, is mounted in the reaction chamber hole 30a of the power piston 30 and is fitted into the annular groove 30g, in an axially movable condition. The output rod 52 is united to a front end portion of the rear member 51. The front end of the output rod 52 abuts an engagement portion of the piston 102 of the brake master cylinder 100 in such a manner as to be able to push the piston 102.

As shown in FIGS. 2 to 6, the slide valve 60 is disposed between the power piston 30 and the input member 40, and mounted coaxially to the power piston 30 in a frontward/rearward movable condition (in an axially movable condition) via a seal ring 61. A spring 62 interposed between the power piston 30 and the slide valve 60 biases the slide valve 60 rearward. A second vacuum valve seat 60a is formed at the rear end of the slide valve 60. The second vacuum valve seat 60a can be seated on a second vacuum valve portion 70c of the control valve 70. A key member 63 and a latch member 64, which are mounted to the power piston 30, and a garter spring 65 control cooperatively the axial movement of the slide valve 60 in terms of axial positions.

As shown in FIGS. 2 and 4 to 6, the slide valve 60 has an annular hook 60b and an annular push slope 60c at its front end portion and has a seal-mounting groove 60d and a latch surface 60e at its axially intermediate portion. The annular hook 60b can be engaged with and disengaged from an arcuate hook 64a formed at the rear, radially inner end of the latch member 64. The annular push slope 60c can be engaged with and disengaged from an arcuate passive slope 64b formed at the rear, radially inner end of the latch member 64. The latch surface 60e can be engaged with and disengaged from the front surface of the key member 63.

In order to limit the axial movement of the plunger 41 and the slide valve 60 relative to the power piston 30, the key member 63 is inserted into the radially extending key member insertion hole 30i formed in the power piston 30. The axially measured thickness of the key member 63 is smaller than the axially measured dimension of the key member insertion hole 30i, so that the key member 63 can move axially by a predetermined quantity relative to the power piston 30.

The key member 63 can abut the rear shell 12 at the rear surface of its opposite end portions projecting radially outward from the power piston 30. The rearward movement limit position of the power piston 30 relative to the housing 10 is where, as shown in FIG. 2, the front wall of the key member insertion hole 30i is in contact with the front surface of the key member 63 while the rear surface of opposite end portions of the key member 63 is in contact with the rear shell 12. The key member 63 can abut, at its central portion, front and rear walls 41b and 41c, respectively, of an annular groove formed at an axially central portion of the plunger 41. The rearward movement limit position of the plunger 41 relative to the power piston 30 is where the front wall 41b of the annular groove is in contact with the front surface of the key member 63 while the rear surface of the key member 63 is in contact with the rear wall of the key member insertion hole 30i. The frontward movement limit position of the plunger 41 relative to the power piston 30 is where the rear wall 41c of the annular groove is in contact with the rear surface of the key member 63 while the front surface of the key member 63 is in contact with the front wall of the key member insertion hole 30i.

The key member 63 can abut, at the front surface of its central portion, the latch surface 60e formed at an axially intermediate portion of the slide valve 60. When the power piston 30 and the slide valve 60 are to be returned to their respectively predetermined positions relative to the housing 10 as shown in FIG. 2 while the slide valve 60 is located at a rearward position relative to the power piston 30, the return operation is performed as follows. Before restricting the rearward movement of the power piston 30, the key member 63 restricts the rearward movement of the slide valve 60, thereby causing the slide valve 60 to return to the predetermined frontward position relative to the power piston 30.

As shown in FIGS. 1 and 2, the latch-member-mounting hole 30h is formed in the power piston 30 in a radially extending condition and opens at the outer surface of the power piston 30; and the latch member 64 is mounted in the latch-member-mounting hole 30h in such a manner as to be linearly movable in a radial direction and can project outward from the power piston 30. The garter spring 65 is circumferentially attached to the power piston 30 and biases the latch member 64 radially inward. Notably, although unillustrated, the present embodiment employs two latch members 64 that are disposed diametrically opposite positions.

As shown in FIGS. 2 and 7 to 9, the latch member 64 has the following structure. The arcuate hook 64a, the arcuate passive slope 64b, and an arcuate passive slope 64c are formed at a radially inner end portion of the latch member 64. The arcuate hook 64a can be engaged with and disengaged from the annular hook 60b of the slide valve 60. The arcuate passive slope 64b can be engaged with and disengaged from the annular push slope 60c of the slide valve 60. The arcuate passive slope 64c can be engaged with and disengaged from an annular push slope 41d of the plunger 41. A stepped portion 64d is formed at a radially intermediate portion of the latch member 64. The stepped portion 64d can abut a stopper 30h1 (see FIG. 7) formed on the wall of the latch-member-mounting hole 30h of the power piston 30. A mounting groove 64e for the garter spring 65 is formed at a radially outer end portion of the latch member 64.

When the frontward-movement quantity of the plunger 41 of the input member 40 relative to the power piston 30 is equal to or less than the predetermined value, the push slope 41d formed on the plunger 41 remains separated from the passive slope 64c of the latch member 64. The hook 60b of the slide valve 60 and the hook 64a of the latch member 64 remain engaged with each other. As a result, as shown in FIG. 2, the slide valve 60 is held at a predetermined frontward position. In this manner, the hook 64a of the latch member 64, the hook 60b of the slide valve 60, and the garter spring 65 function cooperatively as holding means for holding the slide valve 60 at the predetermined frontward position.

When the frontward-movement quantity of the plunger 41 of the input member 40 relative to the power piston 30 is greater than the predetermined value, the push slope 41d formed on the plunger 41 pushes the passive slope 64c of the latch member 64, thereby causing the latch member 64 to move radially outward against the biasing force of the garter spring 65. As a result, the hook 60b of the slide valve 60 is disengaged from the hook 64a of the latch member 64. The spring 62 causes the slide valve 60 to move rearward by a predetermined quantity, so that the second vacuum valve seat 60a formed at the rear end of the slide valve 60 is seated on the second vacuum valve portion 70c of the control valve 70. In this manner, the push slope 41d of the plunger 41, the passive slope 64c of the latch member 64, and the spring 62 function cooperatively as moving means for moving the slide valve 60 rearward by the predetermined quantity.

When the key member 63 is to cause the power piston 30 and the slide valve 60 to return to their respectively predetermined positions relative to the housing 10 as shown in FIG. 2 while the slide valve 60 is located at a rearward position relative to the power piston 30, the return operation is performed as follows. Immediately before the power piston 30 is returned to its predetermined position, the slide valve 60 is returned to its predetermined position and stops. Accordingly, the passive slope 64b of the latch member 64 abuts the push slope 60c of the slide valve 60 and is then pushed by the push slope 60c. As a result, the latch member 64 is temporarily pushed radially outward against the biasing force of the garter spring 65.

Thus, when the power piston 30 returns to its predetermined position, the biasing force of the garter spring 65 causes the latch member 64 to move radially inward, so that the hook 64a of the latch member 64 is re-engaged with the hook 60b of the slide valve 60. In this manner, the key member 63, the push slope 60c of the slide valve 60, the passive slope 64b of the latch member 64, and the garter spring 65 function cooperatively as return means for returning the slide valve to the predetermined frontward position.

The control valve 70 includes an annular movable portion 70A having the vacuum valve portion 70a, the atmospheric valve portion 70b, and the second vacuum valve portion 70c; an annular stationary portion 70B fitted fixedly and airtightly to a stepped portion formed in the control valve receptive-hole 30e of the power piston 30; and a cylindrical bellows portion 70D connecting the annular movable portion 70A and the annular stationary portion 70B. The annular movable portion 70A is biased frontward by a spring 71 interposed between the annular movable portion 70A and the input rod 42 and is axially movable. The annular stationary portion 70B is fixedly attached to the power piston 30, and a spring 72 is interposed between the annular stationary portion 70B and the input rod 42 so as to apply frontward force to the annular stationary portion 70B.

The vacuum valve portion 70a can be seated on and separated from the paired arcuate vacuum valve seats 30k formed on the power piston 30. When the vacuum valve portion 70a is seated on the paired arcuate vacuum valve seats 30k, communication is shut off between the constant-pressure chamber R1 and the variable-pressure chamber R2. When the vacuum valve portion 70a is separated from the paired arcuate vacuum valve seats 30k, communication is established between the constant-pressure chamber R1 and the variable-pressure chamber R2. The atmospheric valve portion 70b can be seated on and separated from the annular atmospheric valve seat 41a formed on the plunger 41. When the atmospheric valve portion 70b is seated on the annular atmospheric valve seat 41a, communication is shut off between the variable-pressure chamber R2 and the atmosphere. When the atmospheric valve portion 70b is separated from the annular atmospheric valve seat 41a, communication is established between the variable-pressure chamber R2 and the atmosphere. The second vacuum valve portion 70c can be seated on and separated from the second vacuum valve seat 60a formed on the slide valve 60. When the second vacuum valve portion 70c is seated on the second vacuum valve seat 60a, communication is shut off between the constant-pressure chamber R1 and the variable-pressure chamber R2. When the second vacuum valve portion 70c is separated from the second vacuum valve seat 60a, communication is established between the constant-pressure chamber R1 and the variable-pressure chamber R2.

Filters 91 and 92 are disposed in the filter receptive-hole 30f of the power piston 30 and between the input rod 42 and the power piston 30. The air can flows into the filters 91 and 92 through a ventilation hole 93a formed in a boot 93, which is adapted to externally protect the cylindrical body of the power piston 30. The boot 93 is fixedly fitted, at its front end portion, to a tubular rear-end portion of the rear shell 12 of the housing 10 and is fixedly fitted, at its rear end portion, to an axially intermediate portion of the input rod 42.

In the thus-configured negative pressure type booster of the present embodiment, during ordinary braking, the relative-movement quantity between the input member 40 and the power piston 30 (the frontward-movement quantity of the input member 40 relative to the power piston 30) is equal to or less than a predetermined value. The push slope 41d of the plunger 41 remains separated from the passive slope 64c of the latch member 64. The slide valve 60 is held at the predetermined frontward position shown in FIG. 2. At this time, the slide valve 60 remains stationary relative to the power piston 30, so that an ordinary braking operation is performed.

During emergency braking where a driver steps on the brake pedal 110 in alarm, the relative-movement quantity between the input member 40 and the power piston 30 (the frontward-movement quantity of the input member 40 relative to the power piston 30) becomes greater than the predetermined value. At this time, the push slope 41d of the plunger 41 pushes the passive slope 64c of the latch member 64, thereby causing the latch member 64 to move radially outward against the biasing force of the garter spring 65. As a result, the hook 60b of the slide valve 60 is disengaged from the hook 64a of the latch member 64. The spring 62 causes the slide valve 60 to move rearward by a predetermined quantity.

When the slide valve 60 is moved rearward, the second vacuum valve seat 60a formed on the rear end of the slide valve 60 is seated on the second vacuum valve portion 70c of the control valve 70, thereby shutting off communication between the constant-pressure chamber R1 and the variable-pressure chamber R2. At this time, the plunger 41 and the input rod 42 are moving frontward in a unitary manner, and the slide valve 60 pushes rearward the movable portion 70A of the control valve 70. Thus, the annular atmospheric valve seat 41a formed at the rear end of the plunger 41 and the atmospheric valve portion 70b of the control valve 70 separate rapidly from each other, thereby establishing communication between the variable-pressure chamber R2 and the atmosphere. As a result, in contrast to an ordinary braking operation, shutting off communication between the constant-pressure chamber R1 and the variable-pressure chamber R2 and establishing communication between the variable-pressure chamber R2 and the atmosphere are performed more rapidly, so that output in a jumping state can be rendered greater than that in an ordinary state. Thus, a greater thrust force (output) can be generated than in the case of ordinary braking.

When, upon completion of the above-described emergency braking operation, the brake pedal 110 is returned to its original position, the plunger 41 moves rearward while the front wall 41b of a circumferential groove formed therein is in contact with the key member 63. When the key member 63 abuts the rear shell 12, the key member 63 abuts the latch surface 60e of the slide valve 60, thereby preventing further rearward movement of the slide valve 60 that has moved rearward together with the power piston 30. Subsequently, since the power piston 30 moves further rearward, the passive slope 64b of the latch member 64 that moves rearward together with the power piston 30 abuts the push slope 60c of the slide valve 60 and is then pushed by the push slope 60c. As a result, the latch member 64 is temporarily pushed radially outward against the biasing force of the garter spring 65.

Thus, when the power piston 30 returns to its predetermined position, the biasing force of the garter spring 65 causes the latch member 64 to move radially inward, so that the hook 64a of the latch member 64 is re-engaged with the hook 60b of the slide valve 60. In this state, the negative pressure type booster is prepared for another emergency braking operation.

In the above-described negative pressure type booster of the present embodiment, the latch member 64 is mounted directly in the latch-member-mounting hole 30h of the power piston 30. Furthermore, the latch member 64 mounted in the latch-member-mounting hole 30h is linearly movable in a radial direction. Thus, the negative pressure type booster can have a simple and compact configuration.

In the negative pressure type booster of the present embodiment, the latch member 64 has the hook 64a that can be engaged with and disengaged from the hook 60b provided on the slide valve 60; and the hook 64a, the hook 60b, and the garter spring 65, which biases the latch member 64 radially inward, constitute the holding means. Thus, the movement of the latch member 64 for disengagement of its hook 64a from the hook 60b of the slide valve 60 (the movement of the latch member 64 associated with activation of an emergency braking characteristic) is linear. Accordingly, accuracy in disengagement timing increases, resulting in a consistent threshold value for effecting the emergency braking characteristic. Therefore, inconsistency in activation of an emergency braking operation is reduced.

In the negative pressure type booster of the present embodiment, the latch member 64 is mounted in the radially extending latch-member-mounting hole 30h formed in the power piston 30, in such a manner as to be linearly movable in a radial direction, and can project radially outward from the power piston 30; and the garter spring 65 for biasing the latch member 64 radially inward is circumferentially attached to the power piston 30.

Thus, the latch member 64 and the garter spring 65 can be mounted from the outside of the power piston 30, thereby facilitating the work of mounting the latch member 64 and the garter spring 65 to the power piston 30. Also, since an action of the latch member 64 of projecting outward from the power piston 30 can be visually observed, engagement and disengagement between the hook 64a of the latch member 64 and the hook 60b of the slide valve 60 can be confirmed from the outside of the power piston 30. Therefore, during the production of the negative pressure type booster, a function check can be performed easily and reliably.

In the negative pressure type booster of the present embodiment, the stopper 30h1 is provided in the latch-member-mounting hole 30h of the power piston 30 in order to limit the quantity of radially inward movement of the latch member 64 to a predetermined value. Thus, the stopper 30h1 provides a standby position (terminal position of radially inward movement) for the latch member 64 when the hook 64a of the latch member 64 is disengaged from the hook 60b of the slide valve 60. This ensures smooth return operation in which the hook 60b of the slide valve 60 is re-engaged with the hook 64a of the latch member 64.

The above embodiment is described while mentioning the employment of two latch members 64. However, the number of latch members can be varied as appropriate. For example, the present invention can be embodied through employment of a single latch member. In this case, a single radially extending hole for receiving the latch member is formed in the power piston. Thus, the power piston can assume sufficiently high strength. Also, the number of component parts of a negative pressure type booster can be reduced, whereby the negative pressure type booster can have a simple configuration.

The above embodiment is described while mentioning the vacuum valve seats 30k provided on the power piston 30 and the vacuum valve seat 60a provided on the slide valve 60. However, in the case where, when the slide valve 60 is located at the predetermined frontward position, the vacuum valve seat 60a is located at the position of the vacuum valve seats 30k of the power piston 30, the vacuum valve seats 30k can be omitted.

The above embodiment is described while mentioning a single-type negative pressure type booster. However, the present invention may be embodied in the form of a tandem- or triple-type negative pressure type booster or may be embodied in various other forms without departing from the scope of the invention.

What is claimed is:

1. A negative pressure type booster comprising:
   a housing having a pressure chamber formed therein;
   a movable diaphragm mounted in the housing in a frontward/rearward movable condition and dividing the pressure chamber into a constant-pressure chamber and a variable-pressure chamber;
   a power piston connected to the movable diaphragm;
   an input member provided in the power piston to be moved frontward and rearward relative to the power piston and receiving an external operation force;
   an output member for outputting, to an external device, a thrust force generated by the power piston;
   a slide valve disposed between the power piston and the input member, and mounted coaxially to the power piston to be moved frontward and rearward;
   holding means for holding the slide valve at a predetermined frontward position when a frontward-movement quantity of the input member relative to the power piston is equal to or less than a predetermined value;
   moving means for moving the slide valve rearward by a predetermined quantity when the frontward-movement quantity of the input member relative to the power piston is greater than the predetermined value;
   return means for returning the slide valve to the predetermined frontward position when the power piston and the slide valve return to respectively predetermined positions relative to the housing; and
   a control valve mounted in the power piston and comprising an atmospheric control valve portion for establishing and shutting off communication between the variable-pressure chamber and the atmosphere in cooperation with an atmospheric valve seat provided on the input member, and a vacuum control valve portion for establishing and shutting off communication between the variable-pressure chamber and the constant-pressure chamber in cooperation with a vacuum valve seat provided on at least one of the power piston and the slide valve;
   wherein the holding means comprises a latch member that is mounted to the power piston in such a manner as to be linearly movable in a radial direction, and a biasing member for biasing the latch member radially inward; the latch member has a hook that can be engaged with and disengaged from a hook provided on the slide valve; and the hook of the latch member and the biasing member constitute the holding means.

2. A negative pressure type booster according to claim 1, wherein, when the frontward-movement quantity of the input member relative to the power piston is greater than the predetermined value, a push slope provided on the input member pushes a passive slope provided on the latch member toward the exterior of the power piston, whereby the hook of the latch member is disengaged from the hook of the slide valve, and a spring provided between the slide valve and the power piston moves the slide valve rearward by the predetermined quantity.

3. A negative pressure type booster according to claim 1, wherein, when the power piston and the slide valve return to the respectively predetermined positions relative to the housing, a push slope provided on the slide valve temporarily pushes a second passive slope provided on the latch member toward the exterior of the power piston, whereby the hook of the latch member is re-engaged with the hook of the slide valve to thereby hold the slide valve at the predetermined frontward position.

4. A negative pressure type booster according to claim 1, wherein a single latch member is disposed in the power piston.

5. A negative pressure type booster according to claim 1, wherein the latch member is mounted in a radially extending hole formed in the power piston, in such a manner as to be linearly movable in a radial direction, and can project radially outward from the power piston; and the biasing member for biasing the latch member radially inward is a ringlike elastic member that is attached to the outer circumference of the power piston.

6. A negative pressure type booster according to claim 5, wherein a stopper is provided in the power piston in order to limit a quantity of radially inward movement of the latch member to a predetermined value.

* * * * *